United States Patent
Nakajima et al.

(10) Patent No.: US 7,616,883 B2
(45) Date of Patent: Nov. 10, 2009

(54) USER-ROTATABLE CAMERA FOR ENHANCING PANORAMIC IMAGE CAPTURE

(75) Inventors: Yukio Nakajima, Kanagawa (JP); Satoru Ogawa, Tokyo (JP); Kenji Toyoda, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 370 days.

(21) Appl. No.: 11/567,769

(22) Filed: Dec. 7, 2006

(65) Prior Publication Data

US 2007/0253696 A1      Nov. 1, 2007

(30) Foreign Application Priority Data

Apr. 28, 2006   (JP) .............................. 2006-126654

(51) Int. Cl.
*G03B 17/00*   (2006.01)
*G03B 37/02*   (2006.01)

(52) U.S. Cl. ........................... 396/263; 396/20; 396/24; 352/69

(58) Field of Classification Search ................... 396/20, 396/24, 263, 419, 420, 424, 425, 428; 352/69
See application file for complete search history.

(56) References Cited

U.S. PATENT DOCUMENTS

| 4,864,335 A * | 9/1989 | Corrales ...................... 396/24 |
| 4,905,030 A * | 2/1990 | Corrales ...................... 396/425 |
| 5,021,813 A * | 6/1991 | Corrales ...................... 396/24 |
| 5,721,997 A * | 2/1998 | Powell et al. ............... 396/420 |
| 5,870,642 A * | 2/1999 | Mittelstaedt et al. ........ 396/428 |
| 6,714,249 B2 * | 3/2004 | May et al. ................... 348/373 |
| 2006/0175483 A1 * | 8/2006 | Osaka ...................... 248/177.1 |
| 2006/0239677 A1 * | 10/2006 | Friedrich ..................... 396/419 |

FOREIGN PATENT DOCUMENTS

| EP | 1860867 A1 * | 11/2007 |
| JP | 2000-324380 | 11/2000 |
| JP | 2005-229290 | 8/2005 |

* cited by examiner

*Primary Examiner*—Jay M Patidar
(74) *Attorney, Agent, or Firm*—Thomas J. Strouse; Peyton C. Watkins (57) ABSTRACT

A pair of rotation plates 10 are provided on an upper surface and a lower surface of a camera body 30. The rotation plates 10 are rotatable with respect to the camera body 30. During panorama imaging, a user holds the pair of rotation plates 10 with their fingers to hold a camera 9. An actual rotation angle of the camera body 30 with respect to the rotation plate 10 is detected by an encoder provided inside the camera. When the actual rotation angle reaches a target rotation angle, an image capturing process of an element image is automatically executed.

7 Claims, 11 Drawing Sheets

USER-ROTATABLE CAMERA FOR ENHANCING PANORAMIC IMAGE CAPTURE

CROSS REFERENCE TO RELATED APPLICATION

This application claims priority to Japanese Patent Application No. 2006-126654 filed on Apr. 28, 2006, which is incorporated herein by reference in its entirety.

FIELD OF THE INVENTION

The present invention relates to a camera used when a panoramic image is generated by composing a plurality of images obtained by capturing an image of a subject while rotating/scanning the camera.

BACKGROUND OF THE INVENTION

Technology has been known where a panoramic image is generated by photographing a subject several times while rotating/scanning a camera and by composing a plurality of images. The image to be the basis of a panoramic image shall be hereinafter referred to as an "element image". When obtaining this panoramic image, it is necessary to rotate/scan the camera in a plane parallel to a lens optical axis. This rotation/scanning is performed manually in many cases. However, if the camera is rotated manually, it is difficult to maintain its positional accuracy and rotation angle accuracy, and thus it is difficult to obtain a favorable panoramic image.

In order to solve the above problems, a camera platform dedicated to panoramic photographing is proposed. Japanese Patent Laid-Open Publication No. 2000-324380, for example, discloses a platform on which a motor for rotating a camera body is loaded. By using such a platform exclusively for panoramic photographing, the camera body can be accurately rotated and a favorable panoramic image can be obtained.

Also, Japanese Patent Laid-Open Publication No. 2005-229290 discloses a camera in which a photographing portion of the camera and a main body are constructed separately and both the main body and the photographing portion are relatively rotated by driving means built in the main body and the photographing portion. At the time of panoramic photographing by this camera, the main body is fixed to a tripod stand and the photographing portion is rotated/scanned with respect to the main body by the built-in driving means.

However, all of the above related arts have a problem that a user cannot use it casually. That is, the platform dedicated to panoramic photographing is not only complicated in installation work and the like but also extremely expensive, which is not suitable for daily enjoyment of panoramic photographing. Also, the camera described in Japanese Patent Laid-Open Publication No. 2005-229290 requires cumbersome preparation such as use of a tripod at the time of panoramic photographing, which is not necessarily easy to use.

It is therefore an advantage of the present invention to provide a camera which can capture an element image of a favorable panoramic image more easily.

SUMMARY OF THE INVENTION

A camera of the present invention includes a camera body, a holding section which is held by a user and rotatable with respect to the camera body, a detector which detects an amount of relative rotation between the holding section and the camera body, and a controller which instructs an image capturing operation according to an amount of relative rotation detected by the detector.

In a preferred embodiment, the holding section includes a rotation plate provided on at least one of an upper surface and a lower surface of the camera body and rotatable with respect to the camera body. In this case, the holding section preferably includes a pair of the rotation plates rotatable with respect to the camera body provided at positions opposed to each other on the upper surface and the bottom surface of the camera body.

In another preferred embodiment, the controller instructs an image capturing operation when the amount of rotation detected by the detector reaches a target rotation amount calculated based on a photographing field angle with respect to the rotation direction. In this case, the target rotation amount is preferably at least less than the photographing field angle with respect to the rotation direction.

In another preferred embodiment, a rotation regulator is further provided for regulating rotation of the camera body with respect to the holding section according to the amount of rotation detected by the detector. Also, in another preferred embodiment, driving means are further provided for rotating/driving the camera body with respect to the holding section. Also, in another preferred embodiment, an auxiliary instrument is provided which is detachable with respect to the holding section, rotatable with respect to the camera body along with the holding section when attached to the holding section and held by a user instead of the holding section.

According to the present invention, the holding section held by the user is rotatable with respect to the camera body, and the image capturing operation is executed according to the amount of rotation of the camera body with respect to the holding section. An element image of a favorable panoramic image can therefore be captured more easily.

BRIEF DESCRIPTION OF THE DRAWINGS

Preferred embodiments of the present invention will be described in detail based on the following figures, wherein.

DESCRIPTION OF PREFERRED EMBODIMENT

Figure 1:
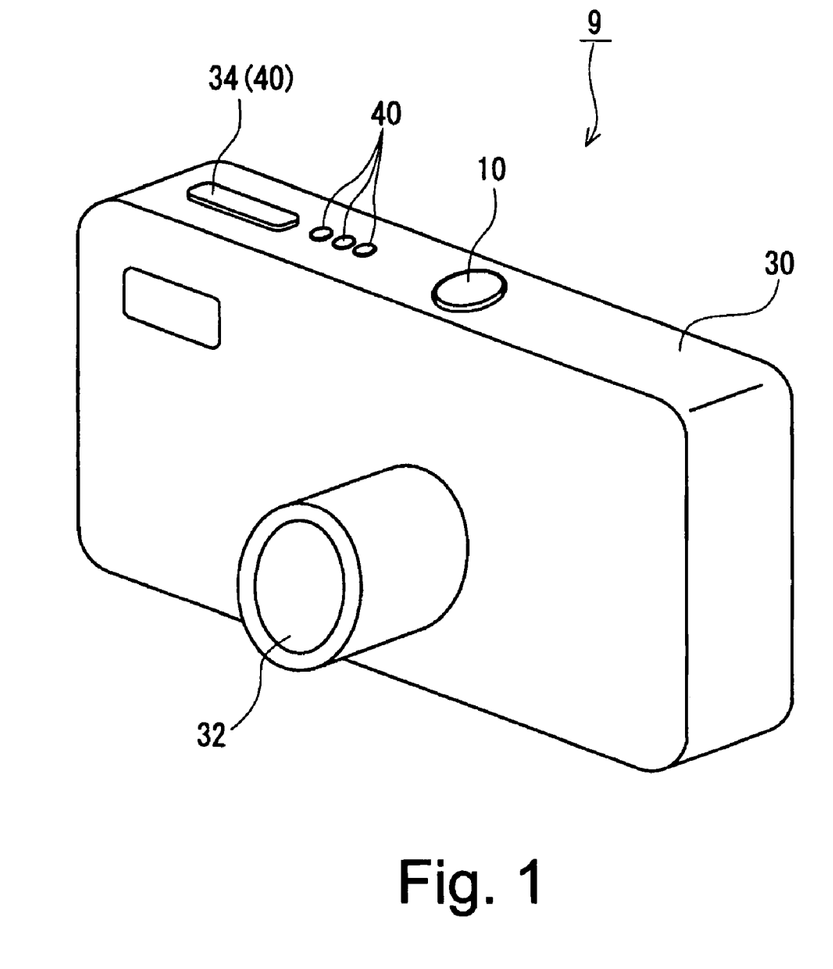
FIG. 1 is a perspective view of a digital camera, which is the first embodiment of the present invention, seen from the front side.
Figure 2:
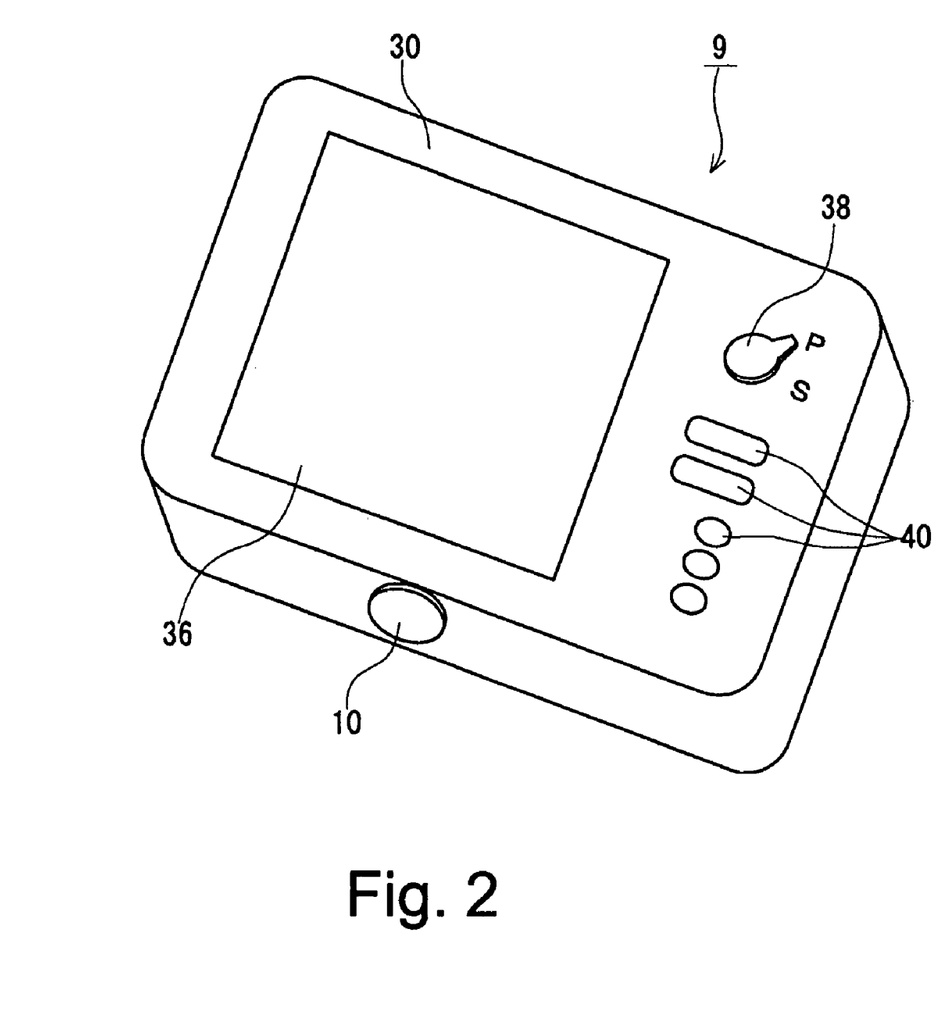
FIG. 2 is a perspective view of the digital camera seen from the back side.

An embodiment of the present invention will be described below referring to the attached drawings. FIG. 1 is a perspective view of a digital camera 9, which is the embodiment of the present invention, seen from the front side, and FIG. 2 is a perspective view seen from the back side. This digital camera 9 has a camera body 30 in the substantially rectangular shape. Similar to a normal digital camera, a lens 32 used for image capturing is provided on the front of the camera body 30, and an LCD 36 for displaying a photographed image is provided on the back side. Beside the LCD 36, a plurality of operators 40 including a mode switch 38 are provided. The mode switch 38 is, as will be described later, a switch for switching between a normal photographing mode and a panoramic photographing mode. When the normal mode is selected, photographing of a normal still image is made possible. On the other hand, when the panoramic photographing mode is selected, a special photographing flow for panoramic photographing is executed.

A plurality of operators 40 are also provided on the upper surface of the camera body 30. These plural operators 40 include a release button 34 for receiving a photographing instruction from a user. When image capturing is to be executed, the user presses down this release button 34.

Moreover, a pair of rotation plates 10 are provided on the upper surface and the lower surface of the camera body 30. These rotation plates 10 are members which are rotatable with respect to the camera body 30 in a plane in parallel with the lens optical axis. Various forms can be adopted for the construction of the rotation plate 10, but it may use a rotation plate including a rolling section having a ball on the bottom face and a guide plate on which a rail for guiding the moving direction of the ball is formed separately from the rolling section. In this case, the guide plate is fixed to the camera body. The pair of rotation plates 10 are provided at positions opposed to each other. At the time of panoramic photographing, which will be described later, the user holds the camera 9 by holding the pair of rotation plates 10 with the fingers. Therefore, at the time of panoramic photographing, these rotation plates 10 function as a holding section held by the user. On the surfaces of the rotation plates 10, a large number of asperities are formed by knurling, milling or the like. As a result, frictional force between the finger and the rotation plates 10 is increased, and slipperiness and the like of the finger holding the rotation plates 10 is prevented.

Figure 3:
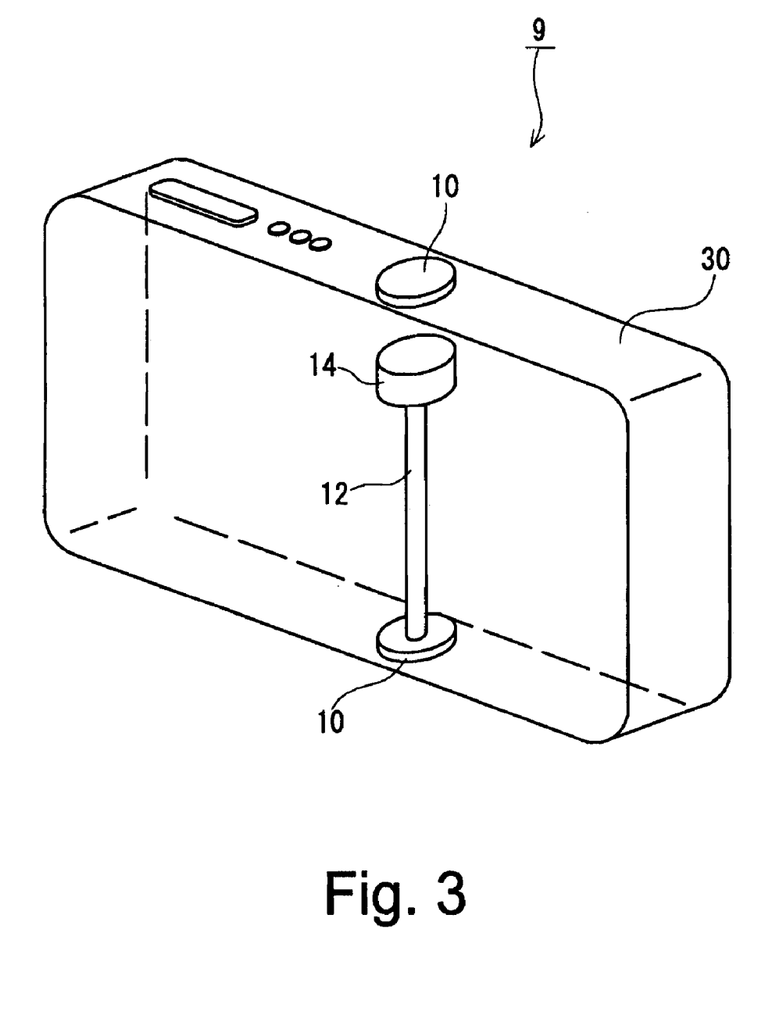
FIG. 3 is a view showing a construction around a rotation plate.

FIG. 3 is a view showing the construction around the rotation plate 10. The pair of rotation plates 10 are provided at positions opposed to each other. Also, a rotating shaft 12 is connected to one of the rotation plates 10. To this rotating shaft 12, a rotary encoder 14 is mounted so that the rotation angle of the rotating shaft 12, and thus of the rotation plate 10 with respect to the camera body 30, can be detected. The detected rotation angle is outputted to a CPU of the camera 9 through a signal line, not shown. It is not necessary to provide two rotation plates 10 as long as one is provided at either one of the upper surface or the lower surface of the camera. In this case, the single rotation plate and one face of the camera body 30 opposing the rotation plate 10 are held by fingers, and rotation of the camera body 30 can be realized by sliding the one face with respect to the finger in contact with the one face of the camera body 30.

Figure 4:
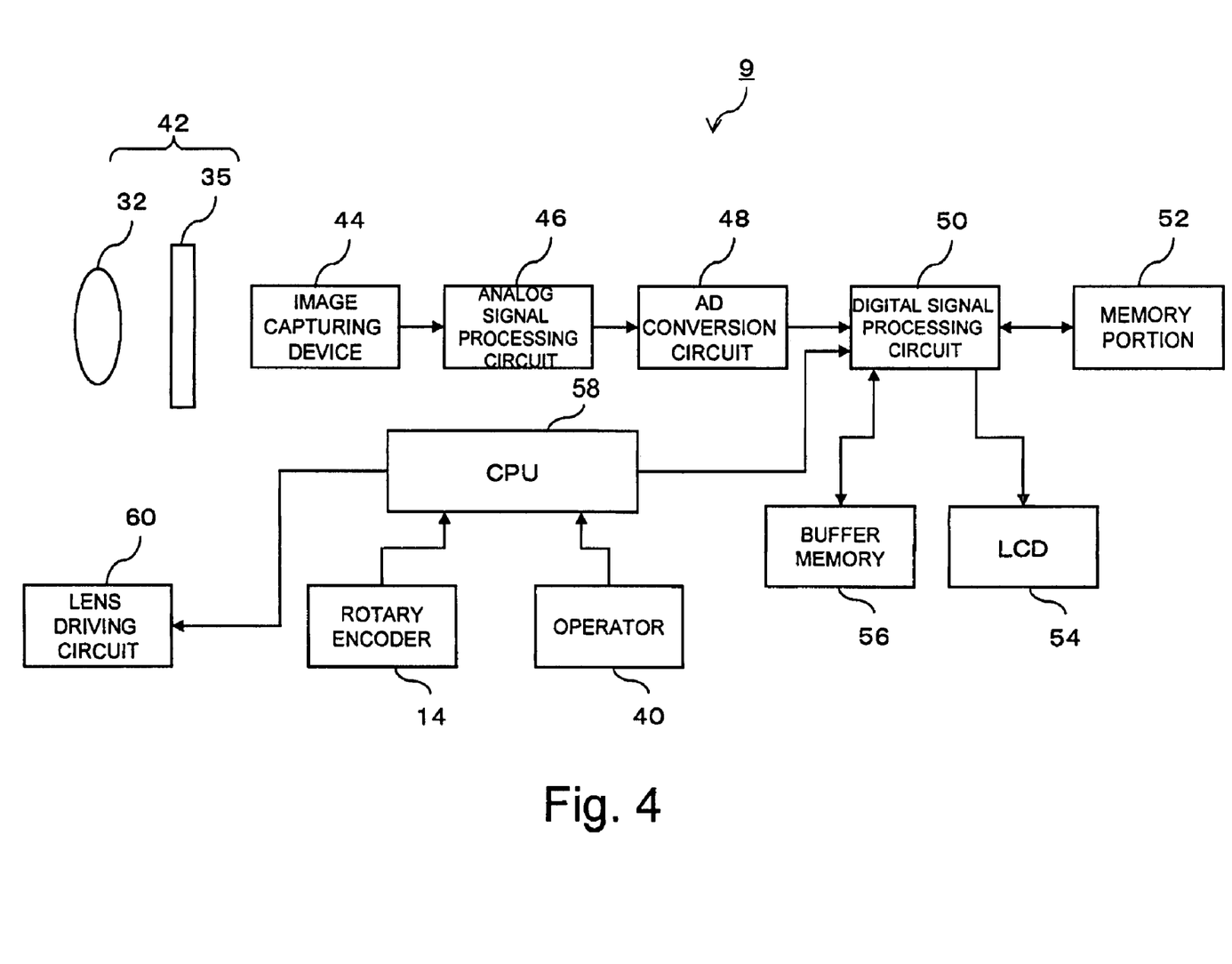
FIG. 4 is a block diagram showing an entire construction of the digital camera.

Next, the entire construction of this digital camera 9 will be described using FIG. 4. FIG. 4 is a block diagram showing the entire construction of the digital camera 9. A photographing lens system 42 including the photographing lens 32, a diaphragm, a shutter and the like 35 is driven according to the instruction from a lens driving circuit 60 and forms an image of a subject. The formed subject image is photoelectrically converted by an image capturing device 44 including a CCD and the like and sent to an analog signal processing circuit 46 as an electric signal. The analog signal processing circuit 46 applies various analog signal processing such as noise cancellation and amplification to the electric signal outputted from the image capturing device 44. The signal to which the analog signal processing is applied is converted to a digital signal at an AD conversion circuit 48 and sent to a digital signal processing circuit 50 as an image signal. The digital signal processing circuit 50 applies various image processing to the image signal. The image processing applied here includes image processing applied to normal image signals such as resize processing, γ correction processing, and white balance processing. The image signal to which predetermined image processing is applied is outputted to an LCD 54 to be displayed or converted to the JPEG format and then, stored, saved in a memory portion 52 made of a memory card or the like. Also, the digital signal processing circuit 50 sequentially saves the image signal to which the predetermined signal processing is applied in a buffer memory 56 for temporary storage at the time of panoramic photographing, which will be described later. Also, when the image signals in the number of images required for creation of a panoramic image are obtained, the plurality of image signals temporarily stored in the buffer memory 56 are taken out and they are composed so as to create a panoramic image. The flow of creation of the panoramic image will be described later in detail.

A CPU 58 controls each portion of the camera on the basis of the instruction inputted from the user through the operators 40 including the release button 34 and the mode switch 38. One of the controls executed by the CPU 58 is control of an amount of rotation of the camera body 30 with respect to the rotation plate 10. This is processing to calculate a rotation angle of the camera body 30 on the basis of the output signal from the rotary encoder 14 and to output an image capturing instruction to the image capturing device 44 as necessary at the time of panoramic photographing.

Figure 5:
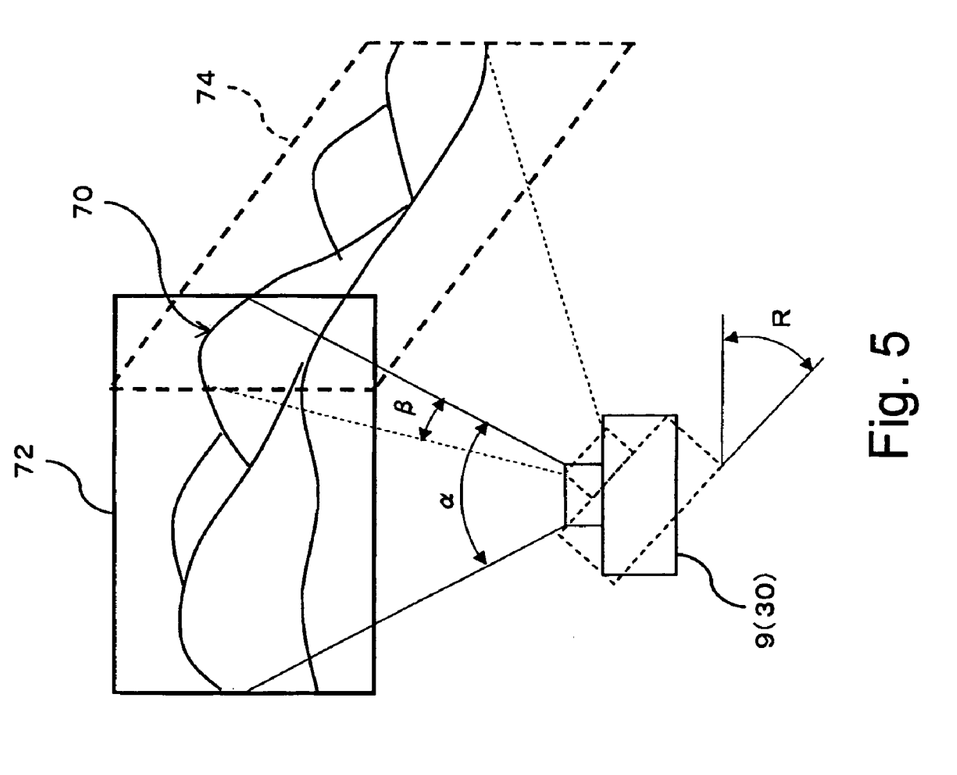
FIG. 5 is an image diagram showing a state of generation of a panoramic image.

Next, an outline of the panoramic photographing processing performed by this camera 9 will be described. FIG. 5 is an image view of the panoramic photographing. The digital camera 9 of this embodiment can generate a single panoramic image by composing a plurality of images continuously shot while rotating/scanning the camera body 30. For example, as shown in FIG. 5, assume a case where a subject image 70 with a wide field angle is to be obtained as a panoramic image. In this case, first, a part of the subject image 70 with the wide field angle is photographed with a photographing field angle α with respect to the horizontal direction (that is, the rotating direction of the camera body 30) so as to obtain a first element image 72. Then, the camera body 30 is rotated in a plane parallel with the lens optical axis, and another part of the subject image 70 with the wide field angle is shot to obtain a second element image 74. A rotation angle R of the camera body 30 at this time shall be a value obtained by subtracting a field angle β for the overlapping portion of the first element image 72 and the second element image 74 from the photographing field angle α with respect to the rotating direction (R=α−β). Also, by composing the first element image 72 and the second element image 74 obtained by the photographing two times, a panoramic image with a wide field angle can be obtained. It is needless to say that the number of photographing times is not limited to two but more photographing can be made so as to obtain a panoramic image with a wider field angle.

When a plurality of element images photographed while the camera 9 is rotated/scanned are composed to obtain a panoramic image, it is necessary to rotate the camera body 30 in a plane in parallel with the optical axis in the photographing process. Such a rotation operation of the camera body has been realized by manual operation by the user or a special platform or the like constructed exclusively for the panoramic photographing. However, with manual operation by the user, it is difficult to maintain positional accuracy and rotation angle accuracy, and there is a problem that an appropriate element image for a panoramic image cannot be obtained.

The platform for the panoramic photographing rotates the camera using a motor or the like and detects and controls the camera rotation amount with a sensor. Therefore, if this platform is used, element images for a panoramic image can be obtained with good accuracy. However, to use such a platform is extremely complicated for users and a panoramic image cannot be obtained casually. Also, such a platform is usually expensive and hard to use for the users who wish to enjoy panoramic images on a daily basis.

Figure 6:
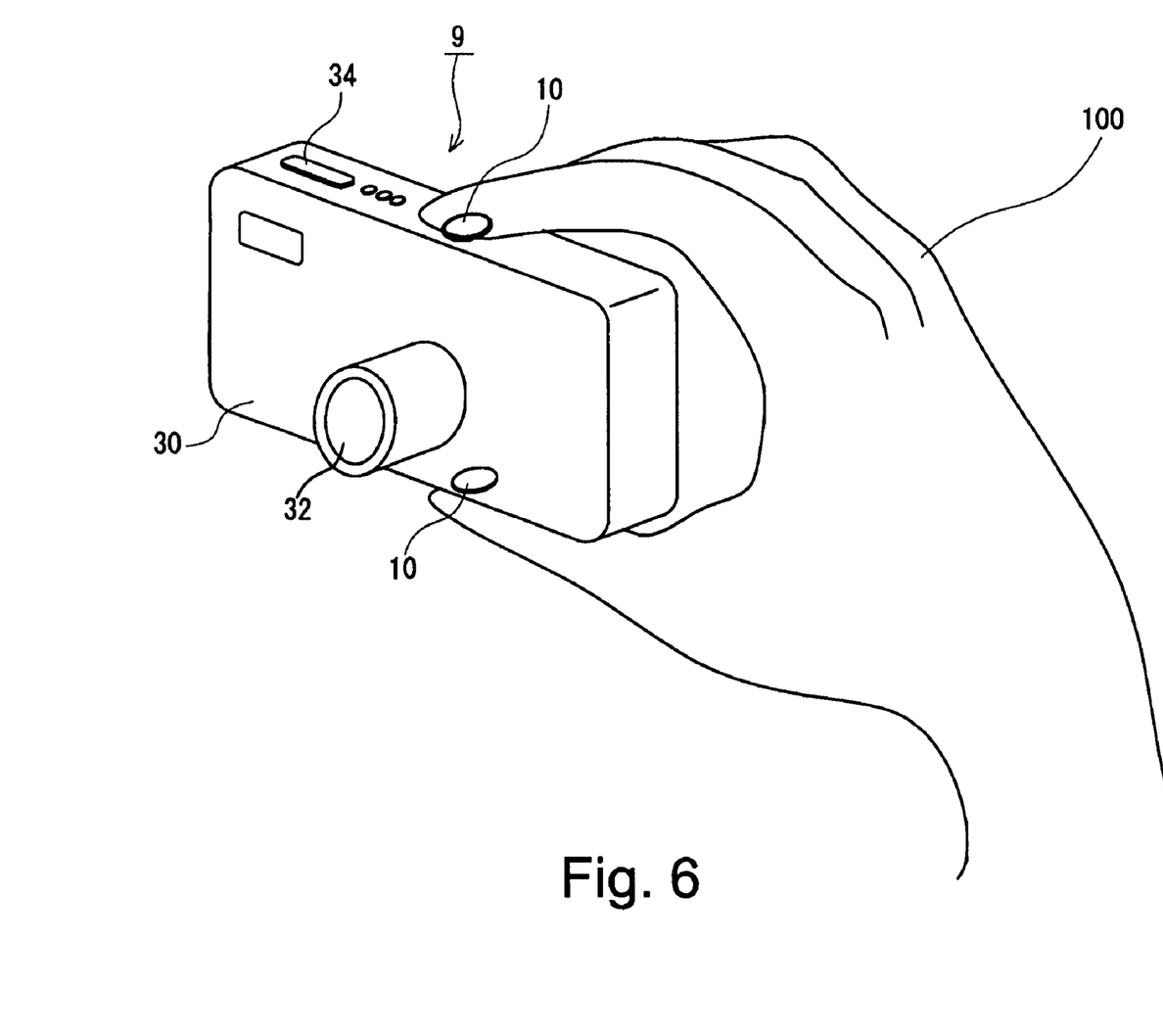
FIG. 6 is a view showing a state at panoramic photographing.

In this embodiment therefore, in order to perform appropriate panoramic photographing more easily, the above-mentioned rotation plates 10 are provided. FIG. 6 is a view showing a state where the panoramic photographing is performed by the camera 9 of this embodiment. At the panoramic photographing, the user holds the camera 9 by holding the pair of rotation plates 10 provided on the upper surface and the lower surface of the camera body 30 with the fingers of one hand 100. When the camera body 30 is to be rotated for capturing an element image for a panoramic image, while maintaining the positions of the fingers holding the rotation plates 10 between them, the user applies a force in the desired rotating direction to the camera body 30 with the other hand. The camera body 30 having received the force is rotated with respect to the rotation plates 10 held between the fingers. In this case, the user can realize rotation of the camera body 30 in a plane in parallel with the optical axis only by paying attention to maintenance of the positions of the rotation plates 10. As a result of this, the camera body 30 can be smoothly rotated, and positional accuracy and the like can be considerably improved compared with the conventional manual operation.

Figure 7:
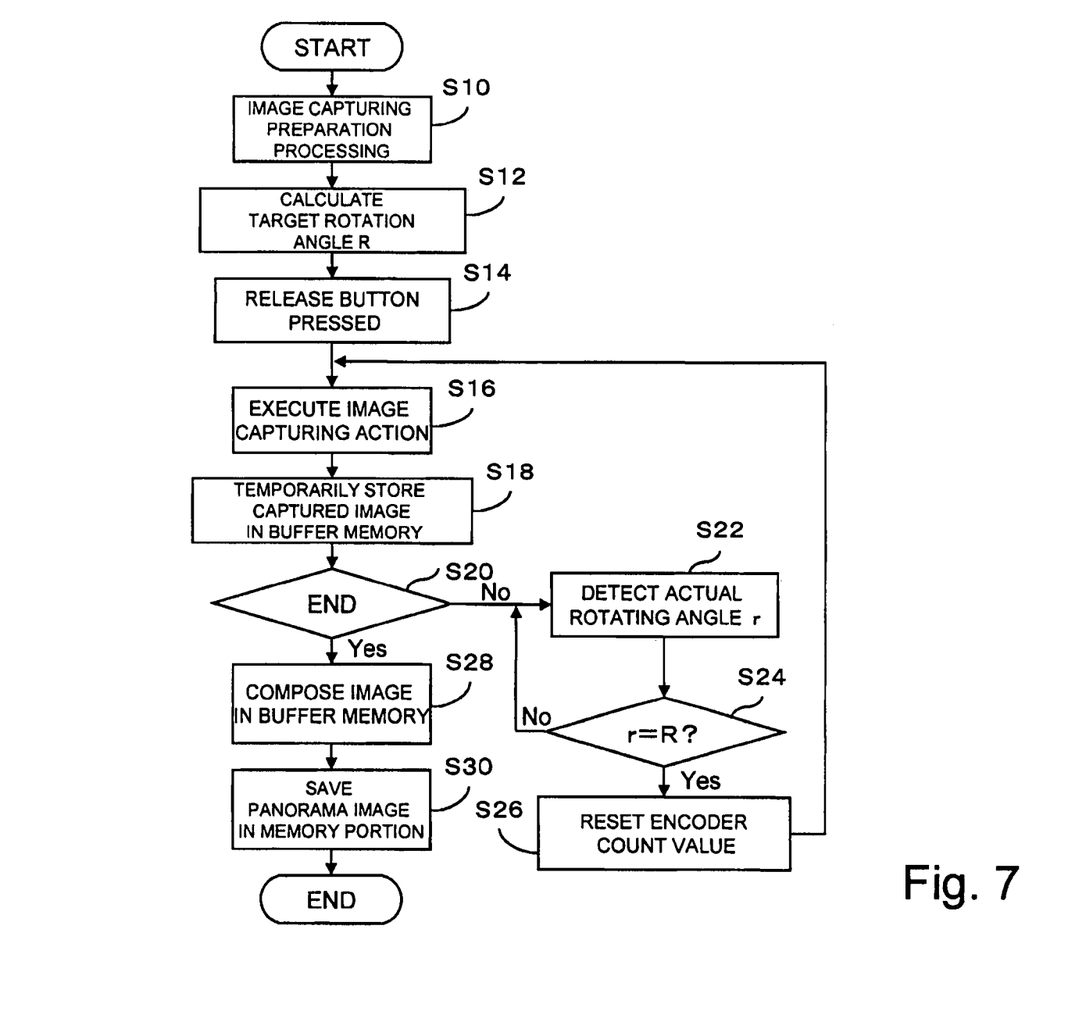
FIG. 7 is a flowchart showing a flow of the panoramic photographing.

Next, the flow of the panoramic photographing using this digital camera 9 will be described using FIG. 7. At the time of panoramic photographing, the mode switch 38 provided on the back face of the camera body 30 is operated in advance to set the "panoramic photographing mode." Also, the camera is held by holding the pair of rotation plates 10 provided on the upper surface and the lower surface of the camera body 30 with the fingers of one hand. That is, the camera 9 is held in the state as shown in FIG. 6. In that state, while checking a preview image displayed on the LCD, the position and the like of the camera 9 is adjusted to obtain a desired angle. Also, with the fingers of the other hand, the various operators 40 provided on the camera 9 are operated. For example, a zoom lever (not shown) is operated to adjust the photographing field angle. The CPU 58 executes the photographing preparation processing on the basis of the instruction inputted by the user here (S10). That is, according to the user's instruction, the photographing field angle, exposure and the like are adjusted. Also, the CPU 58 calculates a target rotation angle R of the camera body 30 required at the time of panoramic photographing on the basis of the photographing field angle with respect to the rotating direction set this time (S12). That is, a value, $R=\alpha-\beta$, obtained by subtracting the field angle $\beta$ corresponding to the overlapped image specified in advance from the set photographing field angle $\alpha$ with respect to the rotating direction is calculated as the target rotation angle R.

On the other hand, the user who has completed various setting presses the release button 34 to instruct image capturing to the camera. The camera 9 having detected the pressing down of the release button drives the image capturing device 44 and the like to execute the image capturing action (S14, S16). The image signal obtained by this photographing is subjected to predetermined image processing by the digital signal processing circuit 50, and then temporarily stored in the buffer memory 56 (S18).

Subsequently, presence of an instruction to end the panoramic photographing is checked (S20). An end instruction here can be in various forms, but the form another pressing down of the release button 34, for example, can be considered as the instruction to end the panoramic photographing. Also, a form where an operator exclusively for the end instruction is provided, a form where a user is asked whether or not to end at the end of every image capturing action and the like can be employed as other forms.

Further, when there is no instruction to end the panoramic photographing, the CPU 58 detects an actual rotation angle r of the camera body based on the pulse count number outputted from the rotary encoder 14 (S22). Also, whether the detected actual rotation angle r has reached the target rotation angle R calculated in advance is determined (S24). That is, the user rotates the camera body 30 in the state holding the rotation plates 10 after capturing of a first element image for a panoramic image. According to the rotation of the camera body 30 at this time, a pulse is outputted from the rotary encoder 14. The CPU 58 calculates the actual rotation angle r from the pulse count number from the rotary encoder 14.

When the actual rotation angle r reaches the target rotation angle R, the pulse count from the rotary encoder 14 is reset (S26). At the same time, capturing of an element image is executed again (S16). That is, the second element image capturing and after is automatically executed at the camera side not based on the instruction from the user. The timing for this automatic image capturing is determined based on the rotation angle of the camera body 30, and the rotation accuracy can be improved compared with the conventional panoramic photographing by manual operation.

At the second element image capturing (S16) and after, the processing from Step S16 to Step S26 is repeated until the instruction to end the panoramic photographing is inputted from the user.

When the instruction to end the panoramic photographing is inputted from the user, the CPU 58 composes the plural element images for a panoramic image temporarily stored in the buffer memory 56 and creates a single panoramic image (S28). At that time, to make a composition at the border between each element image natural, image processing such as deformation of the image, gradation sequence correction and the like is carried out as appropriate.

Also, when the created panoramic image is stored and saved in the storage portion 52, the panoramic photographing processing is ended (S30). As will be obvious from the above description, in this embodiment, by mounting the rotation plates 10 rotatable with respect to the camera body 30, the camera rotation action required for the panoramic photographing can be realized easily and with high accuracy. As a result, the user can enjoy the panoramic image more casually. Also, according to this embodiment, the rotation amount of the camera is detected at the camera side and when it reaches the target rotation amount R, the image capturing action is automatically executed. As a result, the user can obtain the images for a panoramic image more easily without considering the camera rotation amount. Moreover, since the rotation amount is managed at the camera side, the accuracy of the rotation angle can be improved compared with the manual operation case, and as a result, a favorable image for a panoramic image can be obtained.

In this embodiment, when the actual rotation angle r reaches the target rotation angle R, the image capturing action is immediately executed. However, since the rotation of the camera body 30 is not regulated at all at this time, there is a possibility that the entire camera body may laterally move during the image capturing action. Alternatively, while the signal of the image capturing device is being read out immediately after the photographing is ended, display of the LCD 36 is usually turned off, and during that period there is a fear that smooth rotation of the camera body 30 will become difficult. In order to prevent such problems, means for regulating relative rotation of the rotation plates 10 with respect to the camera body may be provided. For example, an electromagnetic lock or the like may be provided to allow or inhibit the rotation of the rotating shaft 12, as appropriate.

Figure 8:
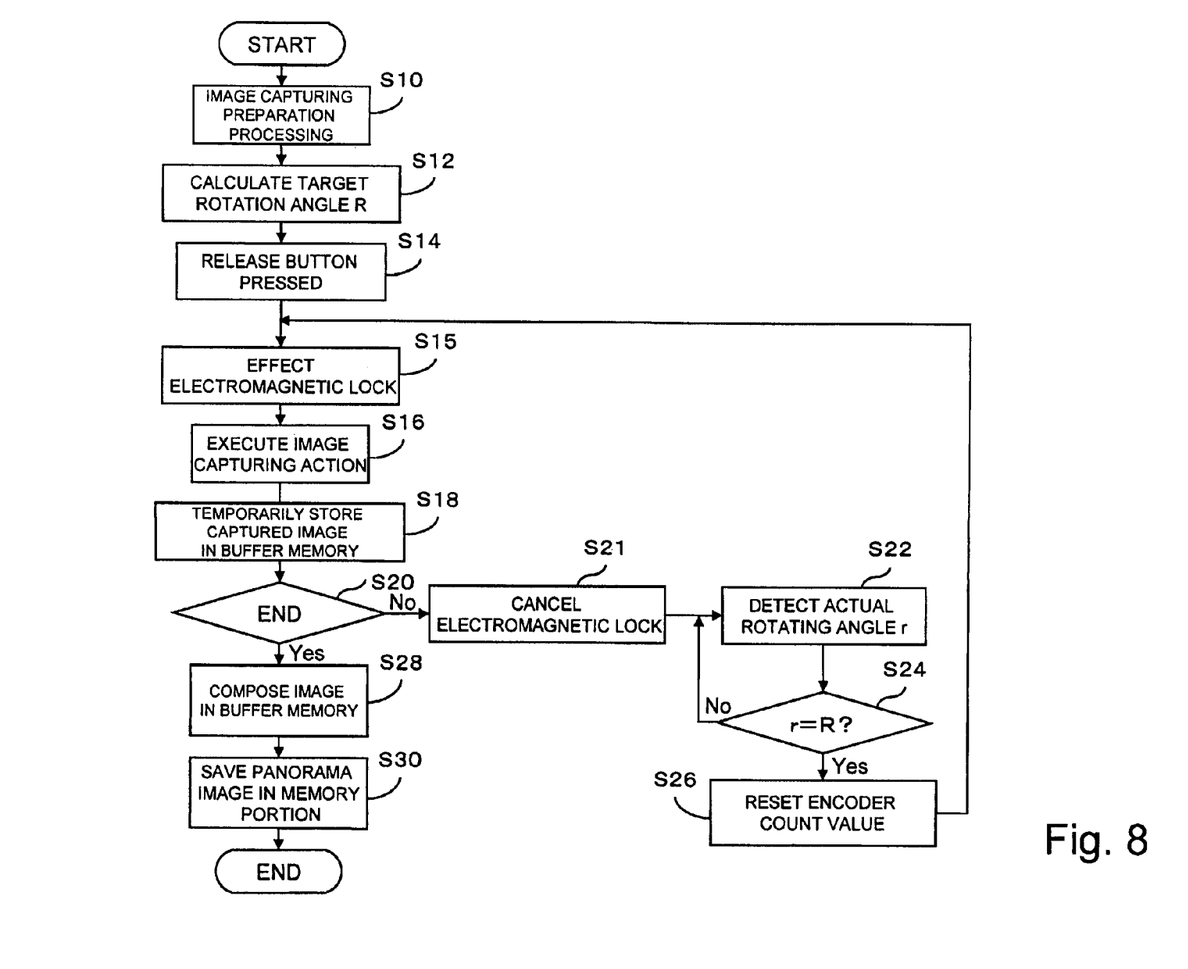
FIG. 8 is a flowchart showing a flow of the panoramic photographing in another example.

FIG. 8 is a flowchart showing the flow of the panoramic photographing when the electromagnetic lock is provided. In this case, when the release button 34 is pressed by the user to instruct start of the panoramic photographing (S14), the CPU 58 brings the electromagnetic lock into the effected state to regulate the rotation of the camera body 30 with respect to the rotation plate 10 (S15). As a result, lateral movement of the camera body 30 during the image capturing action is prevented, and capturing of the element image in the stable state (S16) is made possible. When the image obtained by the image capturing is temporarily stored in the buffer memory 56 (S18), the CPU 58 cancels the electromagnetic lock and allows the rotation of the camera body 30 with respect to the rotation plate 10 (S21). As a result of this, the user can rotate the camera body. When the actual rotation angle r of the camera body 30 reaches the target rotation angle R, the CPU 58 resets the pulse count number and brings the electromagnetic lock into effect. After that, it is only necessary to repeat the similar processing until the instruction to end the photographing is given. As will be obvious from the above description, by providing the rotation regulator such as the electromagnetic lock, more favorable element images can be obtained, and thus a favorable panoramic image can be obtained.

Figure 9:
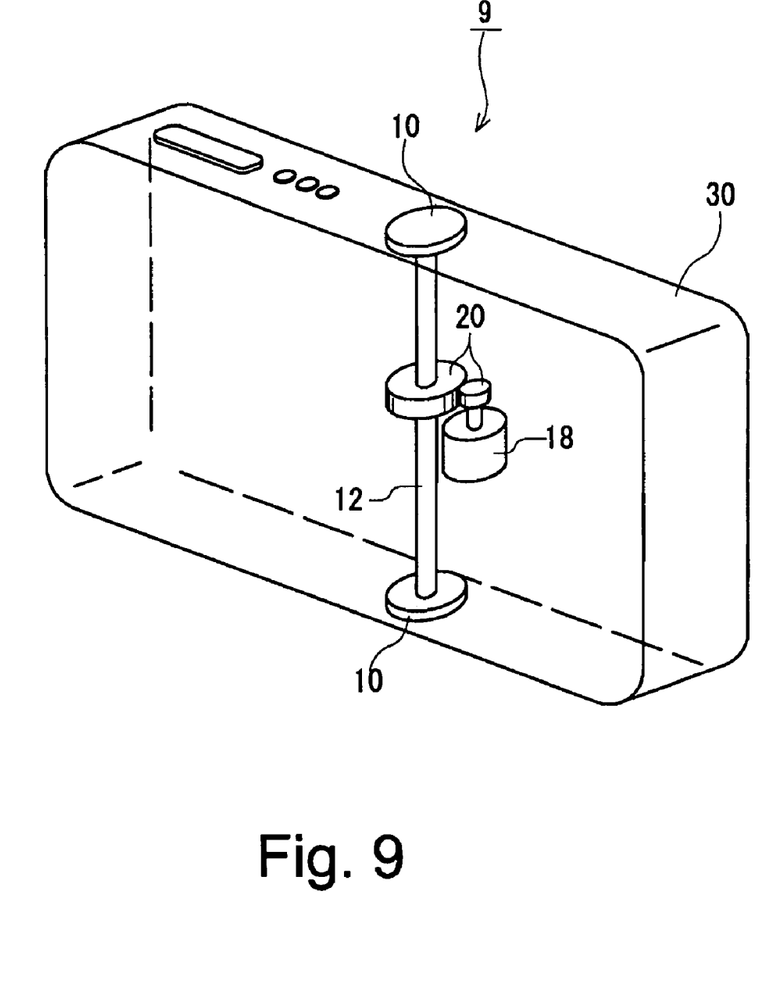
FIG. 9 is a view showing a construction around a rotation plate in the second embodiment.

Next, the second embodiment will be described referring to FIG. 9. FIG. 9 is a view showing the construction around the rotation plate 10 in the digital camera 9, which is the second embodiment. The second embodiment has rotation plates 10 on the upper surface and the lower surface of the camera body 30 provided similarly to the first embodiment. This pair of rotation plates 10 are connected by the rotating shaft 12. Also, inside the camera body 30, a stepping motor 18 applying a torque to the camera body 30 is provided. The main body portion of this stepping motor 18 is fixed to the camera body 30. The output of the stepping motor 18 is transmitted to the rotating shaft 12 and the rotation plates 10 through a gear 20. The CPU 58 detects the relative rotation angle of the rotation plate 10 with respect to the camera body 30 based on the number of pulses of this stepping motor 18. Also, when the stepping motor 18 is stopped, the rotation of the camera body 30 with respect to the rotation plate 10 is regulated by static torque of the motor.

Figure 10:
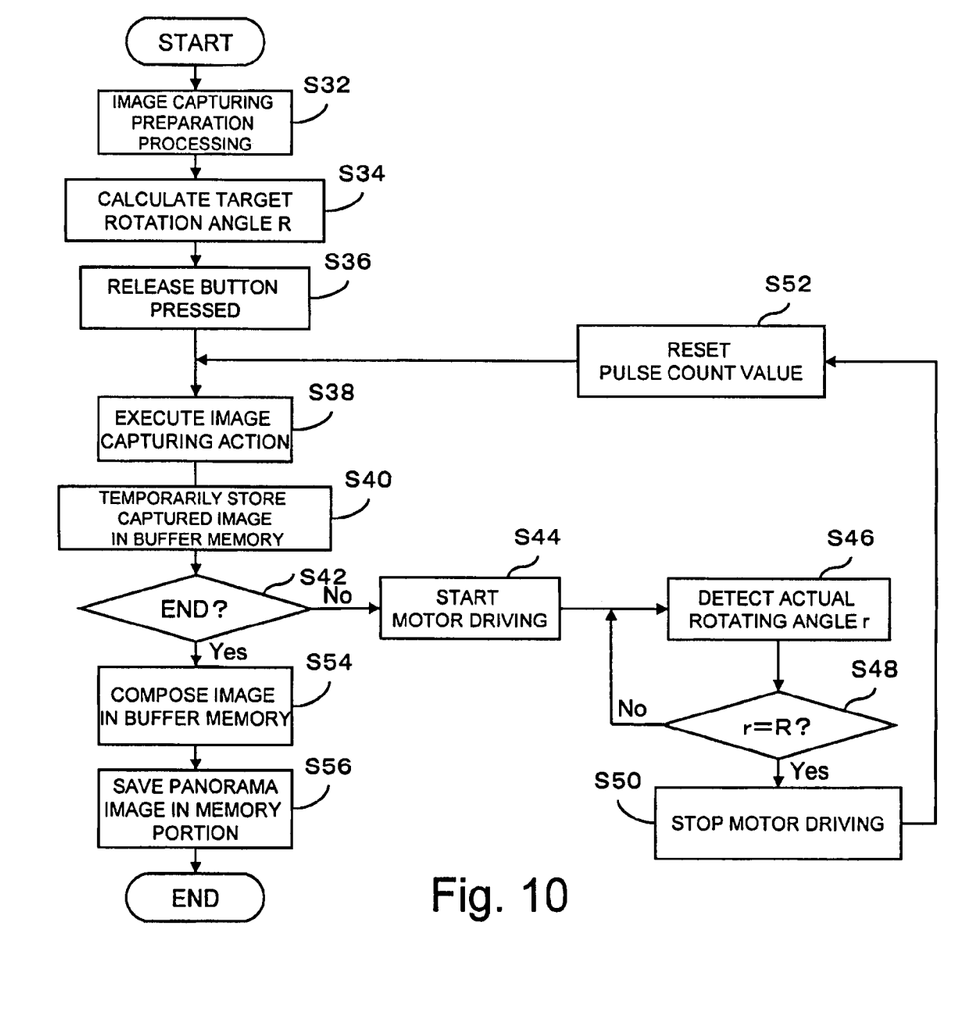
FIG. 10 is a flowchart showing a flow of the panoramic photographing in the second embodiment.

FIG. 10 is a flowchart showing the flow of the panoramic photographing with this digital camera 9. In this embodiment too, similarly to the first embodiment, the panoramic photographing mode is set in advance at the panoramic photographing. The CPU 58 executes the photographing preparation processing such as the field angle and exposure control according to the instruction from the user (S32). Also, it calculates the target rotation angle R based on the set field angle (S34). The user presses the release button 34 in the state where the pair of rotation plates 10 provided on the upper surface and the lower surface are held with the fingers of one hand. The camera having detected the pressing of the release button 34 executes capturing of an element image for the first panoramic image and temporarily stores the obtained image signal in the buffer memory (S36 to S40). During this period, the relative rotation action of the rotation plates 10 and the camera body 30 is regulated by the static torque of the stepping motor 18. Therefore, the image capturing action is executed in the state where lateral movement during the image capturing action or the like is prevented, and a favorable element image can be obtained.

Then, if there is no instruction to end the panoramic photographing from the user, the CPU 58 drives the stepping motor 18 to relatively rotate the rotation plates 10 with respect to the camera body 30 (S42, S44). However, at this time, since the rotation plates 10 are held between the fingers of the user, the camera body 30 is actually rotated with respect to the rotation plat 10, and the CPU 58 counts the driving pulse number of the stepping motor 18 and calculates the actual rotation angle r of the camera body 30 from the count number (S46). This actual rotation angle r is compared with the target rotation angle R (S48), and when it is determined that the actual rotation angle r has reached the target rotation angle R, the CPU 58 stops driving of the stepping motor 18 (S50). Also, the pulse count number is reset, and the photographing action is executed again (S52, S38). The photographing and processing of camera rotation is repeated until an instruction to end the panoramic photographing is given by the user.

When the instruction to end the panoramic photographing is given, a plurality of element images stored in the buffer memory 56 are composed (S54). Then, by storing the single panoramic image obtained by composition in the memory portion 52, the processing is ended (S56).

As described above, according to this embodiment, a driving force of camera rotation is supplied by the stepping motor 18. As a result, the camera can be rotated more easily and more accurately, and as a result, a favorable panoramic image can be obtained more casually.

In both of the above-mentioned first embodiment and the second embodiment, the pair of rotation plates 10 provided on the upper face and the lower face of the camera body 30 are held by fingers. However, in the case of women and children with relatively small hands, there might be a case where the pair of rotation plates 10 cannot be held by one hand. In this case, it is only necessary to provide the above-mentioned rotation plates 10 in the vicinity of the end of the camera body 30. If the rotation plates 10 are provided in the vicinity of the end of the camera body 30, displacement is generated between the lens optical axis and the rotation center of the camera rotation and thus, the photographing range for each obtained element image would be displaced. However, the target rotation angle R is usually calculated considering the field angle β corresponding to the overlapping image to the extent that the displacement can be absorbed. Therefore, even if the rotation plates 10 are provided in the vicinity of the end of the camera body 30 away from the lens optical axis, a panoramic image with sufficient accuracy can be obtained.

Figure 11:
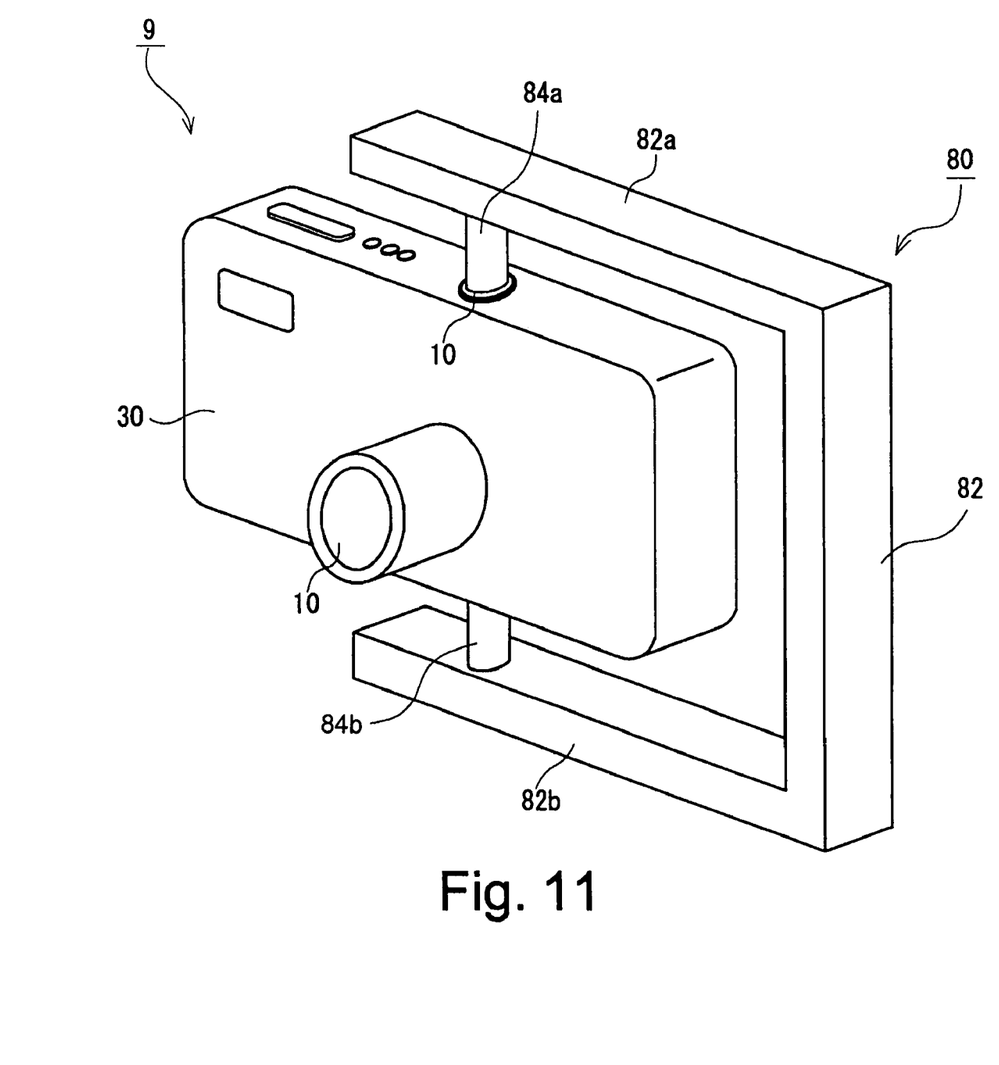
FIG. 11 is a view showing a state of the panoramic photographing using an auxiliary instrument.

As another solution, as shown in FIG. 11, an auxiliary instrument 80 functioning as a hand may be used. This auxiliary instrument 80 includes a substantially U-shaped main body 82, and a pair of holding shafts 84a, 84b extending from the vicinity in both ends of the U-shape. The distance between two sides 82a, 82b opposed to each other in the substantially U-shaped main body 82 is sufficiently larger than the height of the camera body. Also, from the vicinity of the tip ends of these opposing two sides 82a, 82b, the pair of holding shafts 84a, 84b extend in the opposing side direction. The holding shafts 84*a*, 84*b* are capable of extending/contracting their length. After the tip end faces of the pair of holding shafts 84*a*, 84*b* are adjusted to be brought into contact with the pair of rotation plates 10 provided on the upper face and the lower face of the camera body 30, the lengths of the holding shafts 84*a*, 84*b* are adjusted in the direction to reduce the spatial distance between the pair of holding shafts 84*a*, 84*b*. In this way, the camera body 30 is held between the pair of holding shafts 84*a*, 84*b* through the rotation plates 10. If the user simply carries out the panoramic photographing while holding the main body 82 of the auxiliary instrument 80, even a child or the like with a relatively small hand can easily perform the panoramic photographing.

PARTS LIST 9 camera
10 rotation plate
12 rotating shaft
14 rotary encoder
18 stepping motor
20 gear
30 camera body
32 lens
34 release button
35 shutter
36 LCD
38 mode switch
40 operator
42 photographing lens system
44 image capturing device
46 analog signal processing circuit
48 AD conversion circuit
50 digital signal processing circuit
52 memory portion
54 LCD
56 buffer memory
58 CPU
60 lens driving circuit
70 subject image
72 first element image
74 second element image
80 auxiliary instrument
82 U-shaped main body
82*a* side
82*b* side
84*a* holding shaft
84*b* holding shaft
100 hand
S11 step
S12 step
S14 step
S15 step
S16 step
S18 step
S20 step
S21 step
S22 step
S24 step
S26 step
S28 step
S30 step
S32 step
S34 step
S36 step
S38 step
S40 step
S42 step
S44 step
S46 step
S48 step
S50 step
S52 step
S54 step
S56 step

What is claimed is:

1. A camera comprising:
a camera body;
a holding section disposed on the camera body and which is held by a user and rotatable with respect to the camera body;
a detector which detects an amount of relative rotation between the holding section and the camera body;
a controller which instructs an image capturing operation according to an amount of relative rotation detected by the detector; and
an auxiliary instrument which is detachable with respect to the holding section and rotatable with respect to the camera body along with the holding section when attached to the holding section and held by a user instead of the holding section.

2. The camera according to claim 1, wherein the holding section comprises a rotation plate provided on at least one of an upper surface and a lower surface of the camera body and rotatable with respect to the camera body.

3. The camera according to claim 2, wherein the holding section comprises a pair of rotation plates rotatable with respect to the camera body provided at positions opposed to each other on the upper surface and the bottom surface of the camera body.

4. The camera according to claim 1, wherein the controller instructs an image capturing operation when the amount of rotation detected by the detector reaches a target rotation amount calculated based on a photographing field angle with respect to the rotating direction.

5. The camera according to claim 4, wherein the target rotation amount is at least less than the photographing field angle with respect to the rotating direction.

6. The camera according to claim 1, further comprising a rotation regulator which regulates rotation of the camera body with respect to the holding section according to the amount of rotation detected by the detector.

7. The camera according to claim 1, further comprising driving means which rotate/drive the camera body with respect to the holding section.

* * * * *